G. H. GIBSON.
HOT WATER HEATING SYSTEM.
APPLICATION FILED APR. 25, 1910.
1,045,831.
Patented Dec. 3, 1912.
2 SHEETS—SHEET 1.
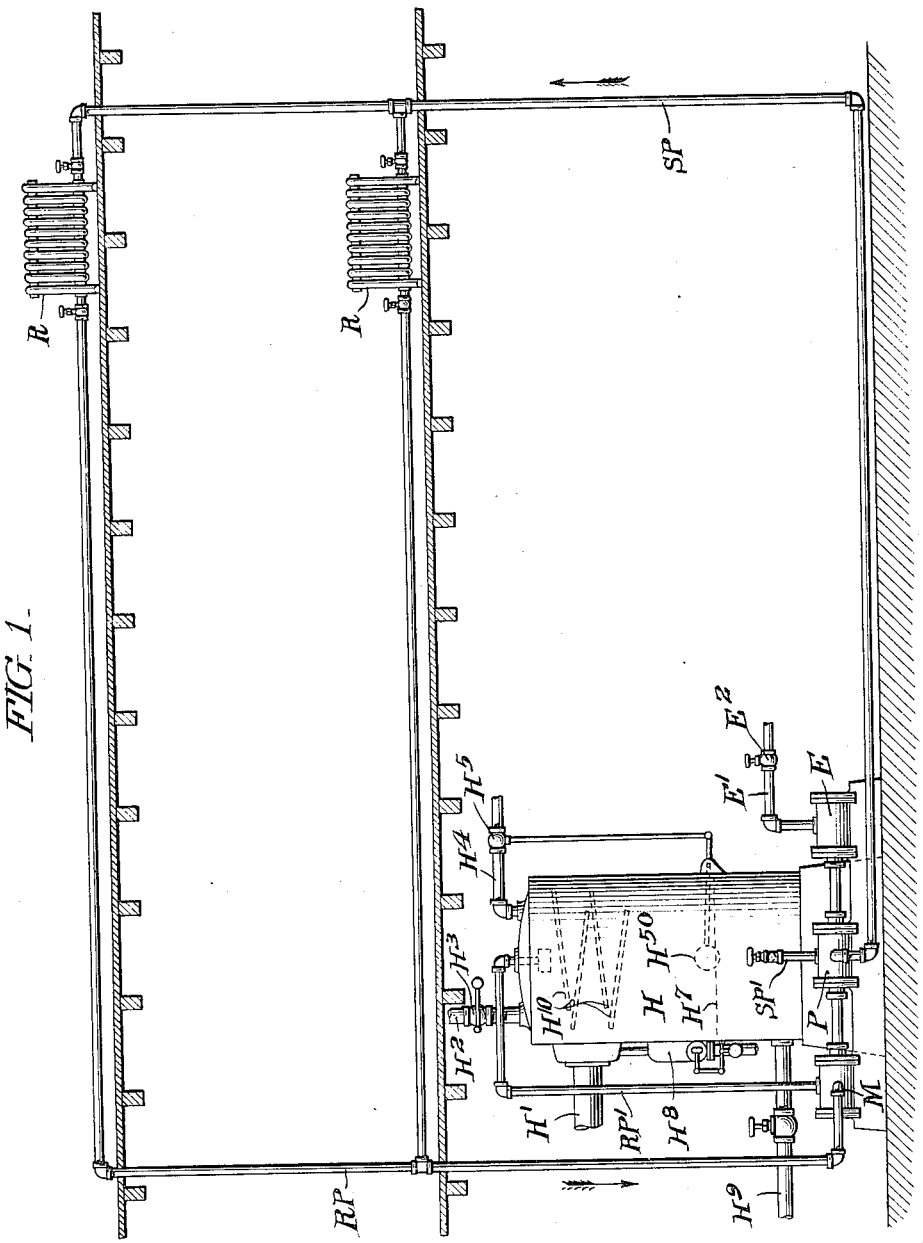
WITNESSES
INVENTOR
George H. Gibson
BY
his ATTORNEY G. H. GIBSON.
HOT WATER HEATING SYSTEM.
APPLICATION FILED APR. 25, 1910.
1,045,831.
Patented Dec. 3, 1912.
2 SHEETS—SHEET 2.
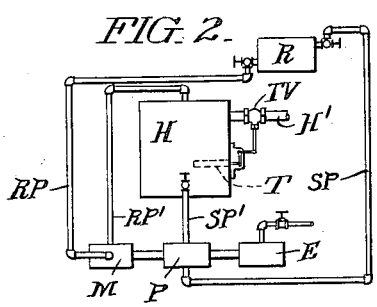
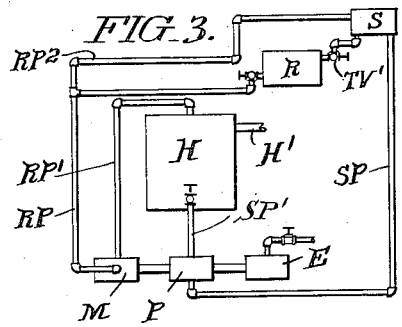
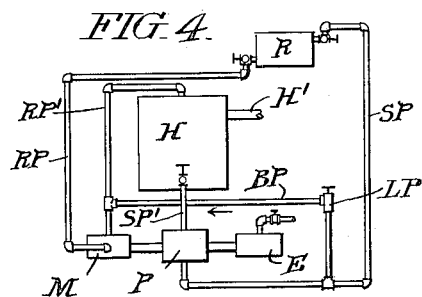
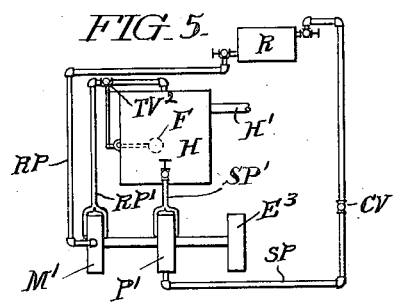
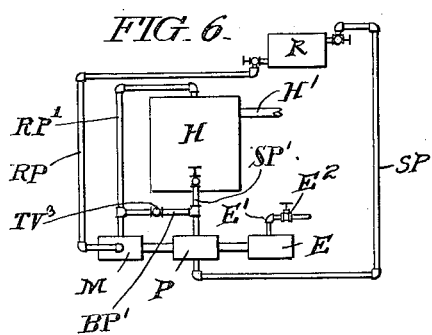
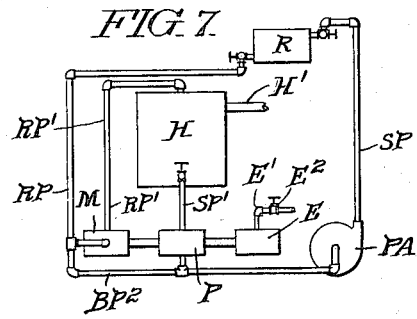
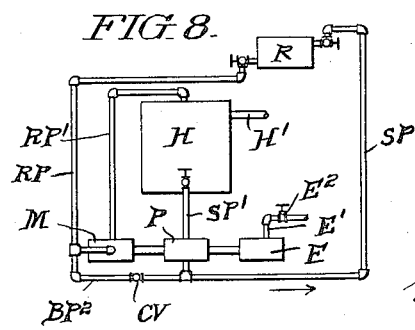
INVENTOR
George H. Gibson
WITNESSES
BY
ATTORNEY

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, OF PHILADELPHIA, PENNSYLVANIA, DOING BUSINESS AS HARRISON SAFETY BOILER WORKS, OF PHILADELPHIA, PENNSYLVANIA.

HOT-WATER HEATING SYSTEM.

1,045,831.   Specification of Letters Patent.   Patented Dec. 3, 1912.

Application filed April 25, 1910. Serial No. 557,369.

*To all whom it may concern:*

Be it known that I, GEORGE H. GIBSON, a citizen of the United States, residing in Montclair, in the county of Essex, in the State of New Jersey, have invented a certain new and useful Improvement in Hot-Water Heating Systems, of which the following is a true and exact description, reference being had to the accompanying drawings, which form a part thereof.

My present invention relates to heating systems in which the heating medium is hot water, and the general object of my invention is the production of a simple, reliable and effective heating system in which a heater like the well-known open feed water heaters used in heating boiler feed water or for like purposes, may be employed with advantage in heating the water circulated through the radiators of a hot water heating system, the water being heated in such a heater by the direct action on the water, of steam admitted to the heater at a moderate pressure, usually not much, if any, greater than the pressure of the atmosphere.

More specifically, one main object of my invention is to provide a system of the kind described, with means for circulating the water through the heater and through the radiating pipes, some portion of which may be located at a level substantially above the level of the heater without the loss of efficiency incident to the direct discharge of the water returned from the radiators into the low pressure heater with the consequent loss of head of that water.

Another object of the invention is to provide simple and effective means for regulating the heating effect of the radiators employed in, and as a part of, a hot water heating system of the kind specified.

The various features of the novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated some of the many forms in which the invention may be embodied.

Of the drawings, Figure 1 is an elevation illustrating a hot water heating system embodying one form of my invention, and Figs. 2, 3, 4, 5, 6, 7 and 8 are diagrammatic representations of systems differing from each other and from the system shown in Fig. 1, in certain respects hereinafter pointed out.

In the drawings, and referring first to the arrangement shown in Fig. 1, the heater H, conventionally illustrated, is of a type of open feed water heater which has long been well known and is in common use. $H'$ represents the steam inlet, $H^2$ the stand pipe for the escape of waste steam and air, $H^3$ a loaded valve controlling the latter, $H^4$ a make-up water inlet, $H^5$ a valve controlling the latter and controlled in turn by a float $H^{50}$ to admit water through the pipe $H^4$ whenever the water level falls below a predetermined level as that indicated by the line $H^7$ in Fig. 1. $H^8$ indicates the usual overflow controlling device for permitting the escape of any excess of water which may accumulate from time to time within the heater. $H^9$ represents a connection for supplying hot water for boiler feed or other purposes. $RP'$ represents the return connection from the heating system to the heater. The pipes $RP'$ and $H^4$ discharge into the upper end of the heater, and $H^{10}$ represents splash trays or baffles for breaking up the entering water and thus facilitating the action on the water of the steam admitted through the pipe $H'$. The circulating system includes a supply pipe SP, radiating coils R of which one on each of two floors is shown in Fig. 1, and RP represents the return pipe. The return pipe RP is connected to the inlet of a water motor M, the outlet of which is connected by the pipe $RP'$ to the heater. The supply pipe SP is connected to the outlet of a pump P, and the pipe $SP'$ leads from the heater below the water level $H^7$ to the inlet of the pump P. The motor M and the pump P in Fig. 1 are shown as reciprocating piston and cylinder devices having their pistons connected together and connected also to the piston of a reciprocating driving motor E which may be a steam engine. $E'$ represents the steam supply pipe for the engine E, and $E^2$ a controlling valve by means of which the speed of the engine E and thereby of the motor M and pump P may be controlled to thereby regulate the flow of water through the circulating system.

With the construction described it will be apparent to those skilled in the art that practically the entire head of water due to the elevation of the highest portion of the circulating system above the heater level $H^7$ is effectively utilized through the motor M in driving the pump P which in turn forces the water from the heater through the circulating system. The extra energy necessary to compensate for the resistance to the flow of water through the pipes and to compensate for the loss of energy due to the fact that in practice neither the motor M nor the pump P can be of perfect efficiency, and also for the loss due to the difference in level between the level of the discharge end of the pipe RP′ and the water level $H^7$ of the heater is supplied by the engine E. By manipulating the controlling valve $E^2$ of the latter, the flow of water through the circulating system may be increased or diminished as desired to insure the proper heat radiating effect from the heat radiating coils R.

Under some conditions of use it may be desirable to regulate the supply of steam to the heater H in response to the demand for heat. In Fig. 2 I have shown one means for accomplishing this result, which comprises a throttling valve TV in the steam supply pipe H′ of the heater which is controlled by a thermostatic device T which projects into the lower portion of the heater so as to be normally immersed in the water therein, and may be constructed and connected to the valve in any well known or suitable manner.

Instead of forcing all of the water through the radiating coils, as in Figs. 1 and 2, a storage reservoir S may be located at some point, preferably at the highest portion of the circulating system as shown in Fig. 3, the water passing to the radiating coils R through the throttling valve TV′ in any desired manner.

$RP^2$ represents a bypass around the radiating coils through which water passing to the reservoir S in excess of that passing through the radiating coils, may overflow in the return pipe RP proper.

In practice I usually prefer to have the effective capacity of the motor M and pump P about the same. On account of the "slip" or loss of efficiency due to leakage by the pistons and through the throttling valves, it is usually advantageous in the case of a reciprocating water motor and the reciprocating water pump to make the effective cross sectional area of the cylinder of pump P slightly greater than the corresponding area in the case of the motor M, and in some cases it may be desirable to make the difference in effective cross sectional area of the pump and motor slightly greater than that necessary to compensate for the slippage, and to make provisions for accommodating movement of water through the pump P greater than that passing through the motor M. To obtain this a bypass BP may be connected about the pump P, as shown in Fig. 4. For instance, the bypass may lead from the supply pipe SP adjacent the outlet side of the pump to the pipe RP′, and may be provided with a loaded check valve LP which will open to permit a flow of water in the direction indicated by the arrow in Fig. 4 on a predetermined rise in pressure on the inlet side of the valve above the pressure of normal operation, but will not open to permit a flow of water in a direction contrary to that indicated by the arrow.

It will be apparent, of course, to those skilled in the art that the invention is not limited to the use of a reciprocating pump, water motor, and driving motor or engine, and in Fig. 5 I have shown diagrammatically an arrangement in which a rotary water motor or turbine M′, a rotary or centrifugal pump P′, and a rotary driving motor $E^3$ are employed. The motor $E^3$ may be an electric motor, steam turbine, or like device. The wheels, or rotating elements of the various devices M′, P′ and $E^3$, are shown as mounted on a common shaft. With a rotating water motor or turbine M′ and a centrifugal pump P′, as shown in Fig. 5, when the motor and pump are stopped the water will flow under its own head through the motor and the pump into the heater H and flood the latter, unless steps are taken to prevent this. To avoid the possibility of trouble from this cause I may place a check valve CV in the supply pipe SP, and put a throttle valve $TV^2$ in the pipe RP′, controlling the latter by a float F in the heater which closes the valve when the water level in the heater reaches a predetermined height. With a centrifugal pump P′ and a motor in the form of a turbine M′, the fact that the pipe RP′ may be closed by the controlling valve $TV^2$ while the motor and pump are in operation, will not result in damage to the apparatus, for, as is well known, these pumps, unlike reciprocating pumps, can continue to operate without damage when their outlets are closed, although of course there is then a loss of the energy required in operating the pumps against the frictional opposition to their movements.

Under some conditions of operation it may be desirable to maintain a circulation of water through the radiating coils without passing some or all of the water through the heater, thereby obtaining a heat radiation through the heat radiating coils something less than the maximum obtainable with a given volume of circulating water, and in Figs. 6, 7 and 8 I have shown different arrangements for accomplishing this. In Fig. 6 I accomplish this by putting a by-pass BP' between the pipes RP' and SP' and providing a throttle valve TV³ in this bypass. When this throttle valve is wide open all of the water circulated by the pump P will be drawn from the pipe RP' and none from the heater. When the throttle valve is entirely closed, all of the water circulated will be drawn from the heater, and when the throttle valve is partly open the water circulated will be drawn partly from the heater and partly from the pipe RP'. The temperature of the water circulated will vary accordingly.

In Fig. 7, PA represents an auxiliary circulating pump in the supply pipe SP. A pipe BP² connected to the return pipe RP adjacent the inlet of the water motor, and to the supply pipe SP adjacent the outlet of the pump P, forms a by-pass about the motor M, pump P and heater H. With this arrangement the pump PA may maintain a substantial circulation through the coils R, but when the pump P and the motors M and E are out of operation, none of the water circulated will pass through the heater H. When the pump P and motor M are in operation, however, more or less of the water passing from the radiating coils through the return pipe RP to the connection with the pipe BP², will be diverted through the heater, and a corresponding amount of water will be withdrawn from the heater and passed to the pipe SP through the pump P, and by regulating the speed of operation of the motor M and pump P, the temperature of the water passing through the coils R can be regulated as desired, while a constant circulation is maintained through the coils at all times.

The system shown in Fig. 8 differs from that shown in Fig. 7 in that the pump PA is done away with. With this arrangement it will be apparent that a gravity circulation may be maintained through the portion of the circulating system which does not include the heater H, motor M, and pump P. To insure that the direction of flow through the coils is always in the desired direction indicated by the arrow, a check valve CV may be placed in the by-pass BP² between the pipes.

It will be apparent to those skilled in the art that the hot water heating system permits of the effective use of an open heater of the kind specified in a heating system where, without the water motor and pump arrangement described, the energy loss due to the loss of the head of the water passing into the heater through the return pipe would make it absolutely impossible from a practical standpoint to employ a heater of this character. This is particularly true where the heating system is employed in heating office buildings in which some of the floors heated may be many stories above the level at which the heater is located. It will also be apparent to those skilled in the art that the means providing for regulating the heating effect of the radiating coils either by regulating the rate of flow or the temperature of the water flowing, give a feasible and desirable regulation.

While, in accordance with the provisions of the statutes I have herein described and illustrated the best forms of the device now known to me, it will be apparent to those skilled in the art that many changes may be made in the form of the device without departing from the spirit of my invention, and that certain features of the invention disclosed may be used with advantage under some conditions without a corresponding use of other features, and I do not wish the claims hereinafter made to be limited to the particular embodiment disclosed more than is made necessary by the state of the art.

Having now described my invention, what I claim as new and desire to secure by Letters Patent, is—

1. In a hot water heating system, an open feed water heater, a circulating system, a connection between said system and the heater through which water may be returned to the heater from the system, said connection including a water motor, a second connection between the system and the heater through which water may pass from the heater into the system including a pump, and a connection between the motor and the pump whereby the motor tends to operate the latter, and a separate motor also connected to the pump for supplying the balance of the power necessary to operate the latter.

2. In a hot water heating system, an open feed water heater, a circulating system, a connection between said system and the heater through which water may be returned to the heater from the system, said connection including a water motor, a second connection between the system and the heater through which water may pass from the heater into the system including a pump, and a connection between the motor and the pump whereby the motor tends to operate the latter, and a separate motor also connected to the pump for supplying the balance of the power necessary to operate the latter, and means for adjusting the speed of the latter motor to thereby regulate the circulation.

3. In a hot water heating system, an open feed water heater, a circulating system, a connection between said system and the heater through which water may be returned to the heater from the system, said connection including a water motor, a second connection between the system and the heater through which water may pass from the heater into the system including a pump, and a connection between the motor and the pump whereby the motor tends to operate the latter, and a separate motor also connected to the pump for supplying the balance of the power necessary to operate the latter, a conduit connected between the return pipe at the inlet side of the water motor and the supply pipe at the outlet side of the pump, forming a bypass about said motor, pump and heater, and means for determining the direction of flow of the water through the circulating system.

GEO. H. GIBSON.

Witnesses:
ROBERT G. CLIFTON,
W. S. GILL.